(12) United States Patent
Kim et al.

(10) Patent No.: US 11,368,942 B2
(45) Date of Patent: Jun. 21, 2022

(54) METHOD FOR TRANSMITTING PHYSICAL UPLINK CONTROL CHANNEL BY TERMINAL IN WIRELESS COMMUNICATION SYSTEM AND APPARATUS SUPPORTING SAME

(71) Applicant: LG ELECTRONICS INC., Seoul (KR)

(72) Inventors: Seonwook Kim, Seoul (KR); Kijun Kim, Seoul (KR); Changhwan Park, Seoul (KR); Hanjun Park, Seoul (KR); Haewook Park, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 16/638,060

(22) PCT Filed: Aug. 10, 2018

(86) PCT No.: PCT/KR2018/009154
§ 371 (c)(1),
(2) Date: Feb. 10, 2020

(87) PCT Pub. No.: WO2019/031904
PCT Pub. Date: Feb. 14, 2019

(65) Prior Publication Data
US 2020/0178244 A1 Jun. 4, 2020

Related U.S. Application Data

(60) Provisional application No. 62/543,954, filed on Aug. 10, 2017.

(51) Int. Cl.
*H04W 4/00* (2018.01)
*H04W 72/04* (2009.01)
(Continued)

(52) U.S. Cl.
CPC ....... *H04W 72/0413* (2013.01); *H04L 1/1812* (2013.01); *H04L 27/18* (2013.01); *H04L 27/34* (2013.01)

(58) Field of Classification Search
CPC .......................... H04W 72/0413; H04L 27/18
See application file for complete search history.

(56) References Cited

U.S. PATENT DOCUMENTS 8,989,169 B2\* 3/2015 Kwon ................... H04L 1/0004
370/344
2015/0319753 A1\* 11/2015 Chen ...................... H04L 5/001
370/277
(Continued)

FOREIGN PATENT DOCUMENTS

KR 1020130083391 A 7/2013
KR 1020140018258 A 2/2014
(Continued)

*Primary Examiner* — Bo Hui A Zhu
(74) *Attorney, Agent, or Firm* — Dentons US LLP

(57) ABSTRACT

Disclosed are a method for transmitting a physical uplink control channel by a terminal in a wireless communication system and an apparatus supporting the same. As a specific example, a terminal according to an embodiment of the present invention may determine a modulation order to be applied to uplink control information (UCI) to be transmitted, on the basis of a payload size of the UCI, and transmit the UCI, to which the determined modulation order has been applied, via a PUCCH resource. The terminal is capable of communicating with at least one of another terminal, a terminal related to an autonomous driving vehicle, a base station or a network.

6 Claims, 12 Drawing Sheets

(51) Int. Cl.
*H04L 1/18* (2006.01)
*H04L 27/18* (2006.01)
*H04L 27/34* (2006.01)

(56) References Cited

U.S. PATENT DOCUMENTS

2016/0192388 A1  6/2016  Ekpenyong et al.
2018/0006791 A1* 1/2018  Marinier ............... H04L 1/1893

FOREIGN PATENT DOCUMENTS

KR  1020140052959 A  5/2014
WO     2016093600 A1  6/2016

* cited by examiner

METHOD FOR TRANSMITTING PHYSICAL UPLINK CONTROL CHANNEL BY TERMINAL IN WIRELESS COMMUNICATION SYSTEM AND APPARATUS SUPPORTING SAME

This application is the National Phase of PCT International Application No. PCT/KR2018/009154, filed on Aug. 10, 2018, which claims priorities under 35 U.S.C. 119(e) to U.S. Provisional Application No. 62/543,954, filed on Aug. 5, 2017, which are hereby incorporated by reference herein in their entirety.

TECHNICAL FIELD

The following description relates to a wireless communication system, and more particularly, to a method for transmitting a physical uplink control channel by a terminal in a wireless communication system and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE

Technical Problem

An object of the present disclosure is to provide a method for transmitting a physical uplink control channel by a terminal in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method for transmitting a physical uplink control channel by a terminal in a wireless communication system, and apparatuses supporting the same.

In one aspect of the present disclosure, a method for transmitting, by a terminal, a physical uplink control channel (PUCCH) to a base station in a wireless communication system may include determining a modulation order to be applied to uplink control information (UCI) based on a payload size of the UCI to be transmitted, and applying the determined modulation order to the UCI and transmitting the UCI through a PUCCH resource.

In another aspect of the present disclosure, a terminal for transmitting acknowledgment information to a base station in a wireless communication system may include a transmitter and a processor operatively connected to the transmitter, wherein the processor is configured to determine a modulation order to be applied to uplink control information (UCI) based on a payload size of the UCI to be transmitted and to apply the determined modulation order to the UCI and transmit the UCI through a PUCCH resource.

The modulation order applied to the UCI may be determined as a first modulation order based on that the payload size of the UCI is less than or equal to a predetermined bit value, or a second modulation order based on that the UCI payload size is greater than the predetermined bit value.

The first modulation order may be quadrature phase shift keying (QPSK), and the second modulation order may be 16 quadrature amplitude modulation (QAM).

In another example, the first modulation order may be 16 QAM or QPSK, and the second modulation order may be 64 QAM.

In addition, based on that the UCI is acknowledgment information, the modulation order applied to the acknowledgment information and whether to bundle the acknowledgment information may be determined according to a bit value range in which the payload size of the acknowledgment information falls.

Specifically, based on that the payload size of the acknowledgment information is less than or equal to a first bit value, the terminal may apply a first modulation order to the acknowledgment information without bundling of the acknowledgment information, and transmit the acknowledgment information through the PUCCH resource.

In addition, based on that the payload size of the acknowledgment information is greater than the first bit value and is less than or equal to a second bit value, the terminal may apply a second modulation order in place of the first modulation order to the acknowledgment information without bundling of the acknowledgment information and transmit the acknowledgment information through the PUCCH resource.

Based on that the payload size of the acknowledgment information is greater than the second bit value and is less than or equal to a third bit value, the terminal may apply bundling and the first modulation order to the acknowledgment information and transmit the acknowledgment information through the PUCCH resource.

Based on that the payload size of the acknowledgment information is greater than the third bit value, the terminal may apply bundling and the second modulation order to the acknowledgment information and transmits the acknowledgment information through the PUCCH resource.

In the configuration described above, the PUCCH resource may be composed of one or two symbols.

Alternatively, the PUCCH resource may be composed of four or more symbols.

The above-described aspects of the present disclosure are merely some of the preferred embodiments of the present disclosure, and various embodiments reflecting the technical features of the present disclosure may be derived and understood by those skilled in the art based on the following detailed description of the disclosure.

Advantageous Effects

As is apparent from the above description, the embodiments of the present disclosure have the following effects.

According to the NR system to which the present disclosure is applicable, the UCI payload to be transmitted by the UE requires a large payload compared to the existing LTE system, and the payload size may also be variously changed according to circumstances.

Accordingly, according to the present disclosure, the UE may efficiently transmit the UCI payload through limited uplink resources by applying an adaptive modulation method according to the UCI payload size to be substantially transmitted.

The effects that may be achieved through the embodiments of the present disclosure are not limited to what has been particularly described hereinabove and other effects of the present disclosure not mentioned above may be derived by those skilled in the art from the following detailed description. That is, it should be noted that unintended effects of the present disclosure may also be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
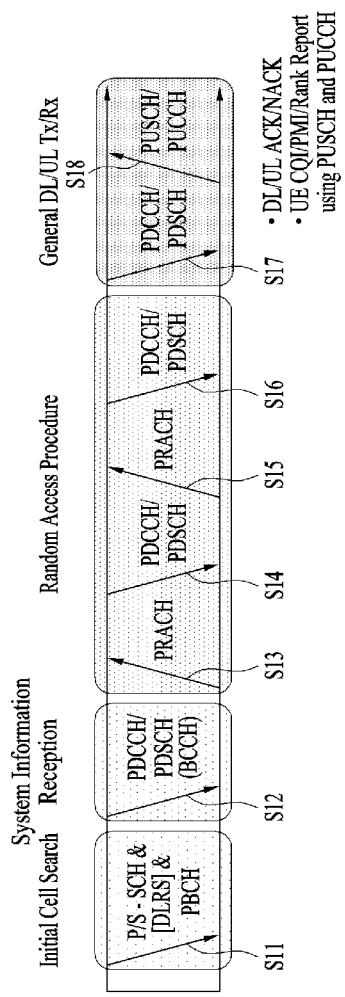
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems and 3GPP NR system are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

For clarification of description for technical features of the present disclosure, although the embodiments of the present disclosure will be described based on a 3GPP NR system as well as a 3GPP LTE/LTE-A system, the present disclosure may be applied to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
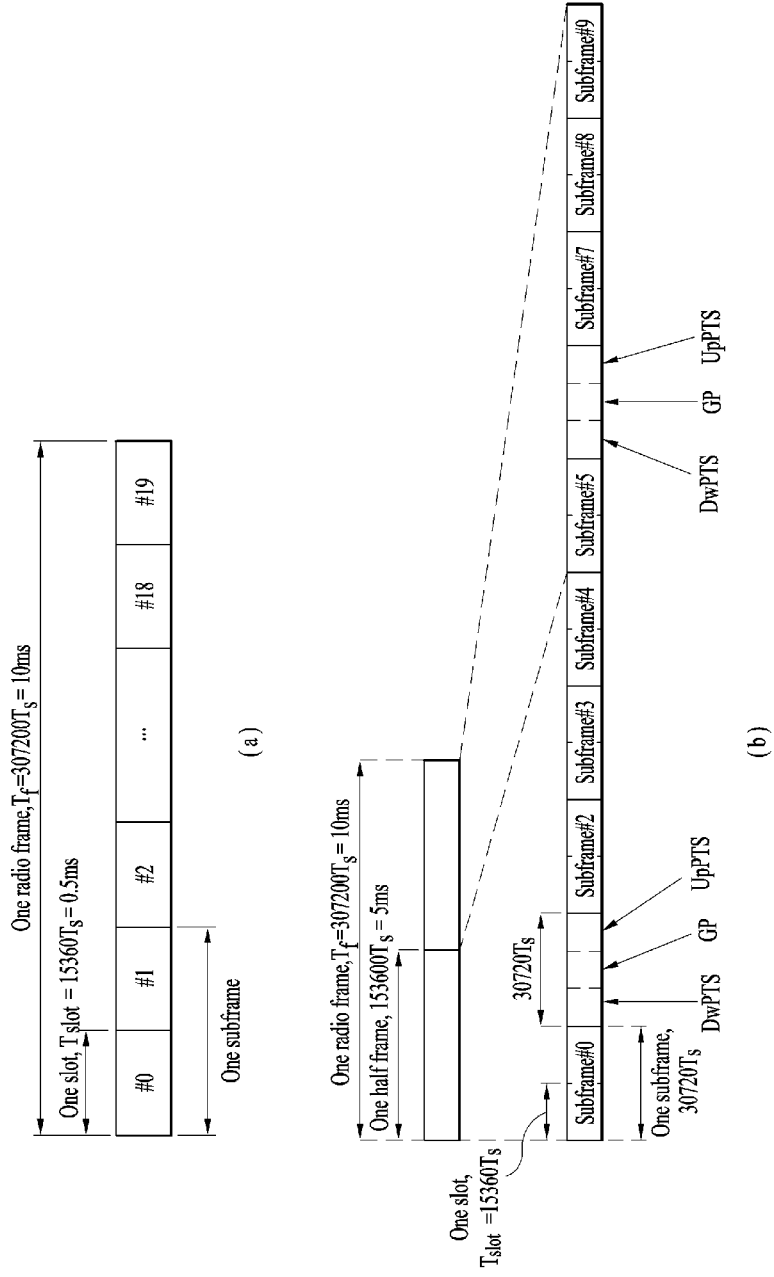
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms (Tslot=15360·$T_s$) long. One subframe includes two successive slots. An ith subframe includes 2ith and (2i+1)th slots. That is, a radio frame includes 10 subframes. A time required for transmitting one subframe is defined as a Transmission Time Interval (TTI). Here, $T_s$ is a sampling time given as $T_s$=1/(15kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An ith subframe includes 2ith and (2i+1)th slots each having a length of 0.5 ms ($T_{slot}$=15360·Ts). Here, $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix sn downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | (1 + X) · 2192 · $T_s$ | (1 + X) · 2560 · $T_s$ | 7680 · $T_s$ | (1 + X) · 2192 · $T_s$ | (1 + X) · 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |

TABLE 2-continued

| | Normal cyclic prefix in downlink | | | Extended cyclic prefix sn downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 4 | 26336 · $T_s$ | | | 7680 · $T_s$ | $(2 + X) \cdot$ | $(2 + X) \cdot$ |
| 5 | 6592 · $T_s$ | $(2 + X) \cdot$ | $(2 + X) \cdot$ | 20480 · $T_s$ | 2192 · $T_s$ | 2560 · $T_s$ |
| 6 | 19760 · $T_s$ | 2192 · $T_s$ | 2560 · $T_s$ | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |
| 10 | 13168 · $T_s$ | 13152 · $T_s$ | 12800 · $T_s$ | — | — | — |

Figure 3:
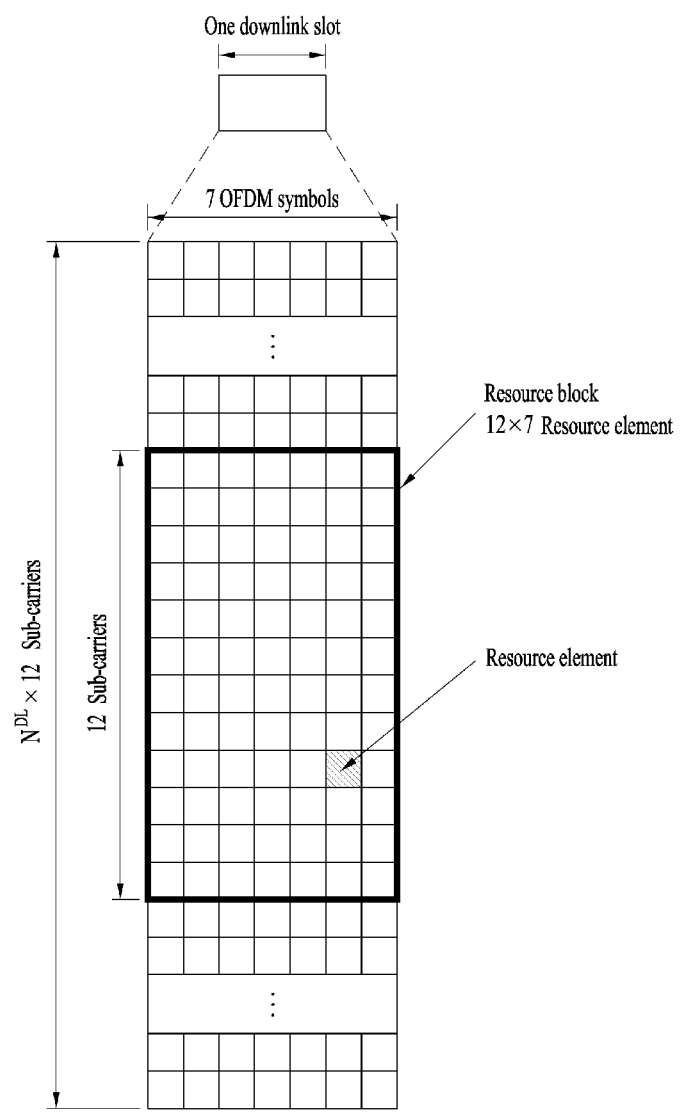
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
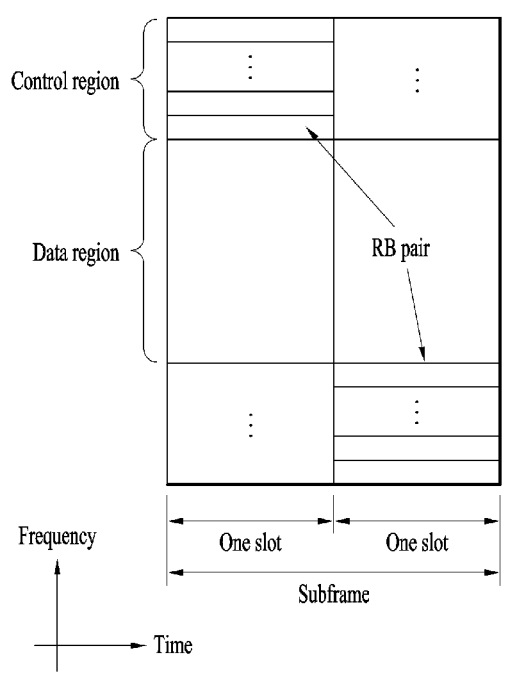
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
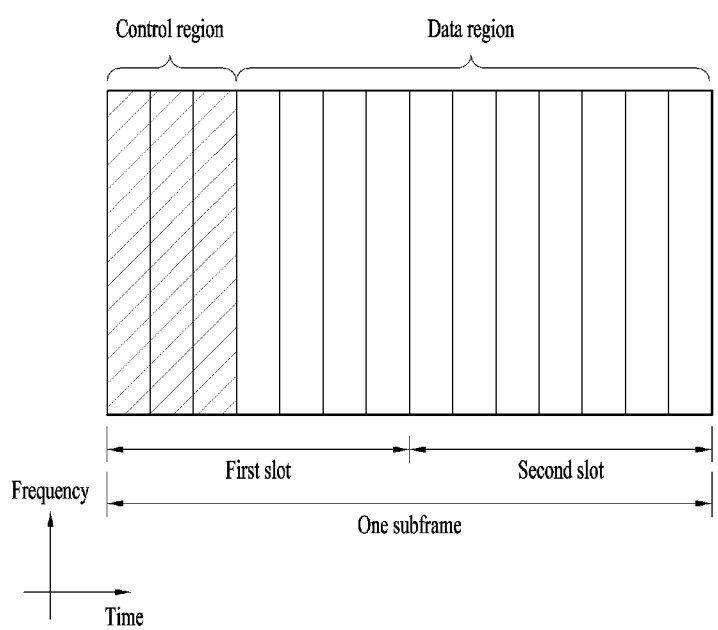
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present disclosure, the corresponding technology is referred to as the new RAT or new radio (NR) for convenience of description.

2.1. Numerologies

The NR system to which the present disclosure is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ and may also be numbered within a frame in ascending order like $n_{s,f}^\mu \in \{0, \ldots, N_{slot}^{subframe,\mu}-1\}$. In this case, the number of consecutive OFDM symbols in one slot ($n_{symb}^{slot}$) may be determined as shown in the following table according to the cyclic prefix. The start slot ($n_s^\mu$) of one subframe is aligned with the start OFDM symbol ($N_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the NR system to which the present disclosure can be applied, a self-contained slot structure can be applied based on the above-described slot structure.

Figure 6:
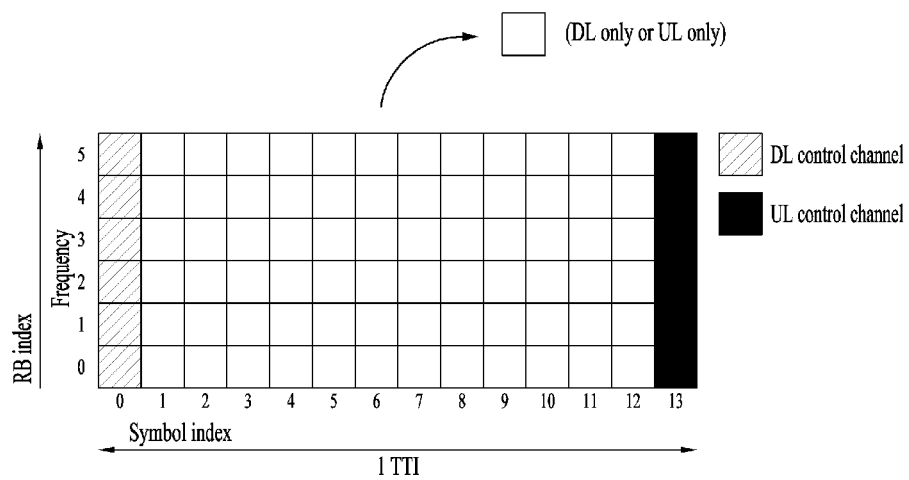
FIG. 6 is a diagram illustrating a self-contained subframe structure applicable to the present disclosure.

FIG. 6 is a diagram illustrating a self-contained slot structure applicable to the present disclosure.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present disclosure may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
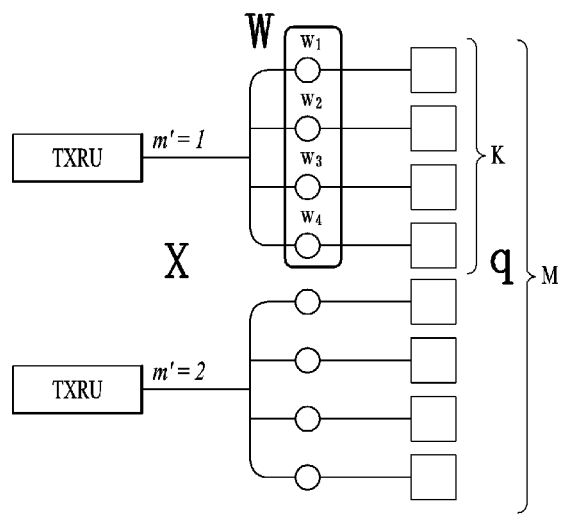
FIGS. 7 and 8 are diagrams illustrating representative connection methods for connecting TXRUs to antenna elements.
Figure 8:
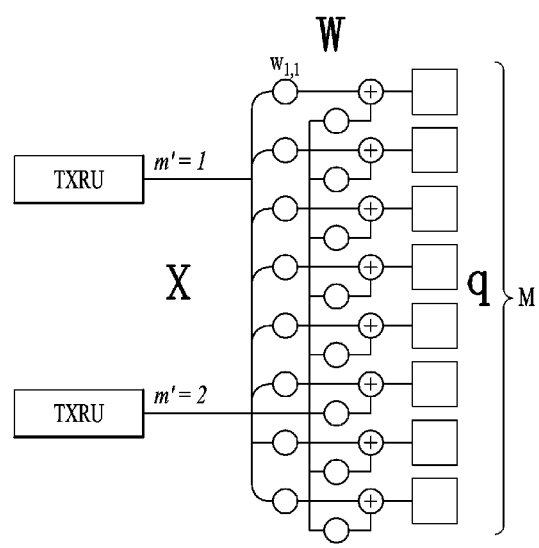

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present disclosure is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
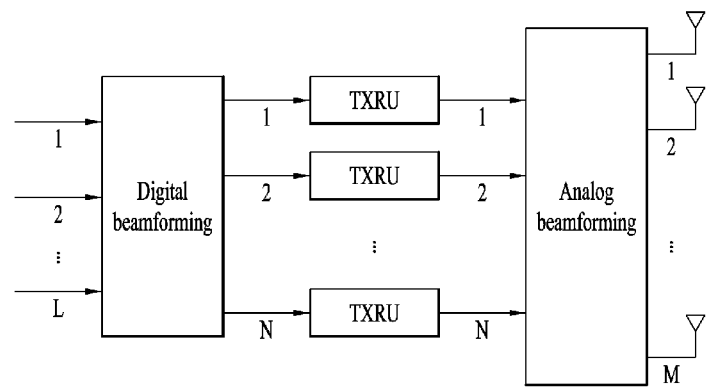
FIG. 9 is a schematic diagram illustrating a hybrid beamforming structure according to an embodiment of the present disclosure from the perspective of TXRUs and physical antennas.

FIG. 9 is a schematic diagram illustrating a hybrid beamforming structure according to an embodiment of the present disclosure from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present disclosure is applicable. Further, a method of introducing a plurality of antenna panels where independent hybrid beamforming can be applied by defining N TXRUs and M RF antennas as one antenna panel has also been considered in the NR system to which the present disclosure is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present disclosure is applicable.

Figure 10:
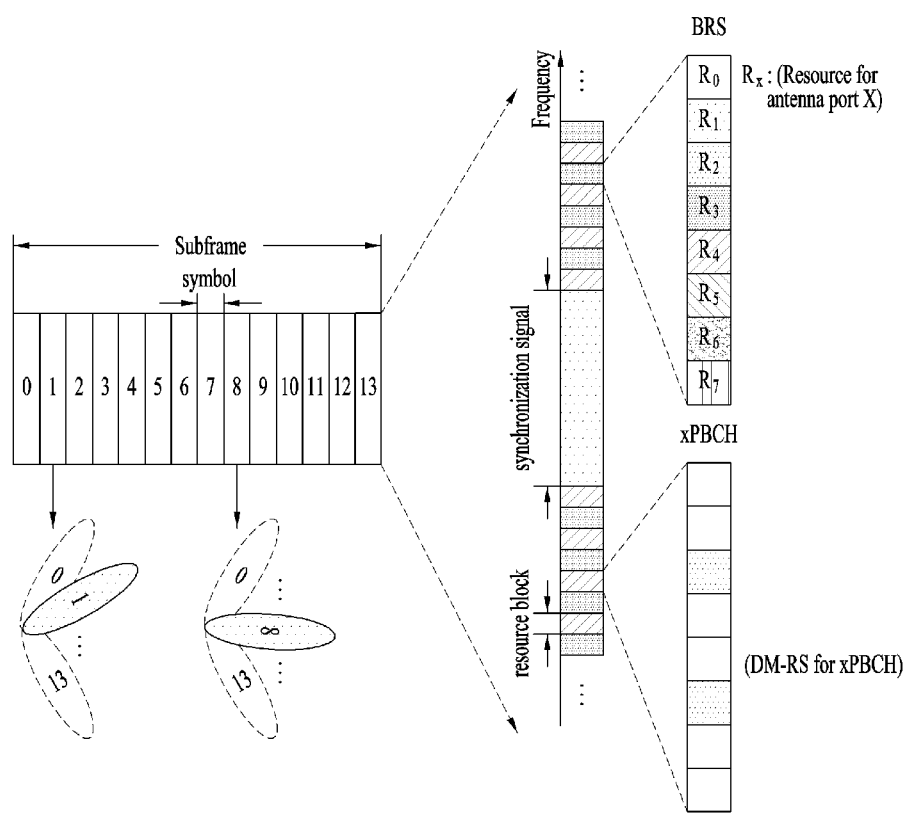
FIG. 10 is a diagram schematically illustrating the beam sweeping operation for synchronization signals and system information during a downlink (DL) transmission process according to an embodiment of the present disclosure.

FIG. 10 is a diagram schematically illustrating the beam sweeping operation for synchronization signals and system information during a downlink (DL) transmission process according to an embodiment of the present disclosure In FIG. 10, a physical resource (or channel) for transmitting system information of the NR system to which the present disclosure is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present disclosure is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

2.4. Bandwidth part (BWP)

In an NR system to which the present disclosure is applicable, a bandwidth of a maximum 400 MHz may be supported per component carrier (CC).

If a specific UE operates in this wideband CC and always operates in a state that RF module for all CCs is powered on, UE battery consumption of the specific UE may be increased.

Otherwise, in the NR system to which the present disclosure is applicable, if various use cases (e.g., eMBB (enhanced Mobile BroadBand), URLLC (Ultra Reliability Low Latency Communication), mMTC (massive Machine Type Communication), etc.) can be supported within one wideband CC, the NR system may support different numerologies (e.g., sub-carrier spacing) per frequency band within the corresponding CC.

Otherwise, UEs operating in the NR system to which the present disclosure may have different capabilities for a maximum bandwidth per UE.

Considering the various cases as above, a BS of the NR system may indicate, to a UE, an operation within a partial bandwidth not a full bandwidth of the wideband CC. At this time, for convenience of description, the partial bandwidth will be referred to as a bandwidth part (BWP). In this case, the BWP may include continuous resource blocks (RBs) on a frequency axis and correspond to one numerology (e.g., sub-carrier spacing, CP (Cyclic Prefix) length, slot/mini-slot duration, etc.).

The BS may configure a plurality of BWPs within one CC configured for the UE.

For example, the BS may configure a first BWP that reserves a relatively small frequency domain for a PDCCH monitoring slot. At this time, PDSCH indicated by PDCCH may be scheduled on a second BWP greater than the first BWP.

Otherwise, if a plurality of UEs are condensed on a specific BWP, the BS may configure a different BWP for some UEs for load balancing.

Otherwise, considering frequency domain inter-cell interference cancellation, the BS may configure both BWPs except some spectrums in the middle of a full bandwidth within the same slot.

Therefore, the BS may configure at least one DL/UL BWP for a UE associated with the wideband CC, and may activate at least one of DL/UL BWPs configured at a specific time (through first layer signaling (L1 signaling) or MAC (Medium Access Control) CE (Control Element) or RRC (Radio Resource Control) signaling, etc.). At this time, the activated DL/UL BWP may be defined as an active DL/UL BWP.

Also, if the UE is in an initial access process, or before RRC connection is configured, the UE may fail to receive a configuration for a DL/UL BWP from the BS. In this case, the UE may assume a default DL/UL BWP. At this time, the DL/UL BWP assumed by the UE in the above status may be defined as an initial active DL/UL BWP.

2.5. DCI Format in NR System

The NR system to which the present disclosure is applicable may support the following DCI formats. First of all, the NR system may support DCI format 0_0 and DCI format 0_1 as DCI formats for PUSCH scheduling, and may support DCI format 1_0 and DCI format 1_1 as DCI formats for PDSCH scheduling. Also, as DCI formats available for the other purposes, the NR system may additionally support DCI format 2_0, DCI format 2_1, DCI format 2_2, and DCI format 2_3.

In this case, the DCI format 0_0 may be used for scheduling of TB (Transmission Block) based (or TB-level) PUSCH, and the DCI format 0_1 may be used for scheduling of TB (Transmission Block) based (or TB-level) PUSCH or (if CBG (Code Block Group) based signal transmission and reception is configured) CBG based (or CBG-level) PUSCH.

Also, the DCI format 1_0 may be used for scheduling of TB based (or TB-level) PDSCH, and the DCI format 1_1 may be used for scheduling of TB based (or TB-level) PDSCH or (if CBG based signal transmission and reception is configured) CBG based (or CBG-level) PDSCH.

Also, the DCI format 2_0 may be used for notifying the slot format, the DCI format 2_1 may be used for notifying the PRB(s) and OFDM symbol(s) where UE may assume no transmission intended for the UE, the DCI format 2_2 may be used for transmission of a TPC (Transmission Power Control) command of PUCCH and PUSCH, and the DCI format 2_3 may be used for the transmission of a group of TPC commands for SRS transmissions by one or more UEs.

Detailed features of the DCI formats may be supported by 3GPP TS 38.212 document. That is, apparent steps or portions, which are not described, among DCI format related features may be described with reference to the above document. All terminologies disclosed herein may be described by the above standard document.

3. Proposed Examples

Hereinafter, the configuration proposed by the present disclosure will be described in detail based on the technical spirit disclosed above.

More specifically, in the present disclosure, a method for transmitting and receiving a physical uplink control channel (PUCCH) to which high order modulation (e.g., 16 Quadrature Amplitude Modulation (QAM)) is applied will be described in detail based on the above-described technical spirit.

In an NR system to which the present disclosure is applicable, an uplink control indicator (UCI) including HARQ-ACK, and/or channel state information (CSI), and/or scheduling request, and/or beam related information may be transmitted on a physical uplink control channel (PUCCH). In this case, in the NR system to which the present disclosure is applicable, a PUCCH of a relatively short duration composed of one symbol or two symbols in a slot consisting of 14 (or 7) Orthogonal Frequency Division Multiplexing (OFDM) symbols (hereinafter, referred to as sPUCCH for simplicity) and a PUCCH of a relatively long duration (hereinafter referred to as long PUCCH for simplicity) composed of 4 or more symbols may be supported as PUCCHs for transmitting the UCI.

In addition, as a physical uplink shared channel (PUSCH) for transmitting UL data in the NR system to which the present disclosure is applicable, an sPUSCH composed of a relative small number of symbols (e.g., 2 or fewer symbols) in a slot and a long PUSCH composed of a relatively large number of symbols (e.g., 4 or more symbols) may be supported.

In addition, a sounding reference signal (SRS) used for UL channel estimation may be transmitted in a slot in which the PUSCH is transmitted.

In the legacy LTE system, when UCI is transmitted on the PUCCH, the UCI is modulated by quadrature phase shift keying (QPSK).

However, in the NR system to which the present disclosure is applicable, as multi input multi output (MIMO) CSI codebook information, beam-related information transmission, and CBG (code block group) based HARQ-ACK more accurate than the LTE system are introduced, the UCI payload size may be larger than in the LTE system, and thus a method for more efficiently transmitting UCI may be considered. In this context, a method for uplink control channel transmission/reception to which a high order modulation scheme (e.g., 16 QAM) is applied in the NR system will be described in detail.

3.1. Triggering UCI Transmission Through High Order Modulation

In the NR system to which the present disclosure is applicable, a PUCCH resource may be determined by the number of symbols (and/or the number of slots) and the number of resource blocks (RBs). In this case, the maximum supportable UCI payload size may be determined according to the number of available resource elements (RE) and the (configured) code rate of the PUCCH resource.

According to the present disclosure, when the maximum supportable UCI payload for a PUCCH resource indicated in the DCI for scheduling DL data is X bits, a modulation scheme to be applied may be determined according to the relationship between the payload size of UCI to be actually transmitted and X.

As an example, when the payload size of UCI to be actually transmitted is less than or equal to X bits, QPSK modulation may be applied to the UCI. When the size is greater than X bits, 16 QAM may be applied to the UCI.

As another example, when the payload size of UCI to be actually transmitted is {X-delta} bits, QPSK modulation may be applied to the UCI. When the UCI payload size is greater than {X-delta} bits, 16 QAM may be applied to the UCI. Here, the value of delta may be predefined or set by first layer signaling (L1 signaling, e.g., DCI) or higher layer signaling (e.g., radio resource control (RRC) signaling).

More specifically, a modulation order applied according to the UCI payload size to be actually transmitted for a specific PUCCH resource may be determined as follows.

When the number of available (or valid) REs for UCI transmission on a PUCCH resource is R, and the modulation order is M1 (e.g. M1=2, QPSK) or M2 (e.g. M2=4, 16 QAM) (where M1<M2), the number of coded bits to be actually transmitted on the corresponding PUCCH is M1*R or M2*R. In this case, the size of a mother code corresponding to M1*R is N1 bits (for example, in the case of polar coding, it may be $2^n$ bits greater or less than M1*R), and the size of a mother code corresponding to M2*R may be N2 bits (for example, it may be $2^n$ bit greater or less than M2*R in the case of polar coding).

Here, when the payload size of UCI to be actually transmitted is K bits, the modulation order to be applied to the corresponding UCI information may be determined by the ratio between K and N1 (or K and N2), that is, the mother code rate. For example, when K/N1 is less than or equal to Th1 (e.g., Th1=2/3), a modulation order corresponding to M1 may be applied to the corresponding UCI. When the value exceeds Th1, a modulation order corresponding to M2 may be applied to the UICI.

Alternatively, the modulation order to be applied to the UCI information may be determined by the ratio between K and M1*R (or K and M2*R). For example, when K/M1/R is less than or equal to Th2 (e.g., Th2=2/3), the modulation order corresponding to M1 may be applied to the corresponding UCI. When the K/M1/R value is greater than Th2 (e.g., Th2=2/3), the modulation order corresponding to M2 may be applied to the UICI.

Here, the value of Th1 or Th2 may be pre-set or may be set by L1 signaling or higher layer signaling.

As another example, when the payload size of UCI to be actually transmitted is less than X bits, QPSK may be applied to the UCI. When the size is greater than X bits, 16 QAM may be applied to the UCI. In this case, the value of X may be set independently of the PUCCH resource.

Additionally, in the legacy LTE system, bundling (e.g., spatial domain bundling or temporal domain bundling) may be performed for HARQ-ACK transmission larger than the maximum HARQ-ACK payload size that may be supported on a specific allocated PUCCH resource. In consideration of this, in the NR system to which the present disclosure is applicable, whether to perform bundling or apply 16 QAM to the UCI (e.g., HARQ-ACK) for HARQ-ACK transmission larger than the maximum HARQ-ACK payload size that may be supported in a specific allocated PUCCH resource may be configured (by higher layer signaling).

Unlike the above-described example, whether to apply QPSK or 16 QAM to UCI to be carried on the PUCCH may be configured by DCI for scheduling DL data or UL data (or higher layer signaling or UE-group common DCI).

More specifically, the modulation order to be applied may be determined differently according to a value indicated by the state of a specific field (e.g., MCS, HARQ ID, RV index, PUCCH resource indicator, etc.) in the DCI for scheduling DL data or UL data. For example, a higher modulation order may be selected when the target data code rate corresponding to the MCS value is greater (or less) than or equal to a specific value. In this case, a linked modulation order may be set for each specific HARQ ID (or RV index) or PUCCH resource index (or PUCCH format).

Alternatively, the UE may directly select the modulation order to be applied to a signal to be transmitted. For example, when the UE determines whether the DL channel quality is good (or bad) based on channel reciprocity in the TDD spectrum, the UE may perform UCI transmission by applying a higher (or lower) modulation order according to the determination result. In this case, information on the modulation order selected by the UE may be transmitted by being coded separately from the existing UCI information (applied to a predetermined modulation order), or the UCI may be transmitted through a PUCCH resource corresponding to the selected modulation order based on a link pre-established between a specific PUCCH resource and the modulation order.

Alternatively, in contrast to the above-described example, when the payload size of UCI to be actually transmitted for a PUCCH resource indicated by the DCI for scheduling DL data is less than or equal to Y bits, a modulation scheme (e.g., binary phase shift keying (BPSK) or pi/2 BPSK) for lowering the modulation order may be applied. Here, the value of Y may be predefined or set by L1 signaling or higher layer signaling.

While a modulation scheme that may be applied has been described above based on two modulation schemes of QPSK and 16 QAM, the operation may be applied to the other two modulation schemes in a similar manner. For example, in selecting a modulation order between 16 QAM and 64 QAM (or QPSK and 64 QAM), the proposed methods may be applied. The proposed methods may be extended and applied to even to selection of a modulation order from among two or more modulation orders (e.g. QPSK, 16 QAM, 64 QAM, etc.).

3.2. Combination of Bundling and 16 QAM

According to the present disclosure, the above-described bundling technique and 16 QAM applied as a modulation scheme for UCI may be combined according to the HARQ-ACK payload size. For example, a method for transmitting HARQ-ACK through a PUCCH resource may be determined by the following 4 steps.

Step 1) If HARQ-ACK payload size $\leq Z1$ bits, QPSK+no bundling;
Step 2) If (Z1<) HARQ-ACK payload size $\leq Z2$ bits, 16 QAM+no bundling;
Step 3) If (Z2<) HARQ-ACK payload size $\leq Z3$ bits, QPSK+bundling; and
Step 4) If HARQ-ACK payload size >Z3 bits, 16 QAM+bundling.

Here, Z1, Z2, and Z3 may be predefined or set by L1 signaling or higher layer signaling. In this case, the values of Z1, Z2, Z3 satisfy the relationship of Z1<Z2<Z3. For example, Z2 may be Z1*2 and Z2 may be greater than Z1*2.

3.3. Bit Mapping

Figure 11:
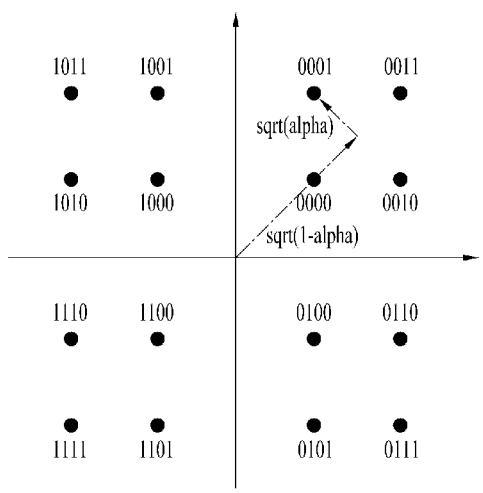
FIG. 11 a diagram illustrating constellation points applicable to the present disclosure and bit information corresponding to each constellation point.

FIG. 11 a diagram illustrating constellation points applicable to the present disclosure and bit information corresponding to each constellation point.

As shown in FIG. 11, when 4-bit information corresponds to each constellation point, there may be a difference in reliability between the front 2 bits (most significant bits (MSBs)) and rear 2 bits (least significant bits (LSBs)). That is, the error probability for the front 2 bits may be less than the error probability for the rear 2 bits.

In this case, the reliability performance between the front 2 bits and the rear 2 bits may be adjusted by setting the value of alpha.

In addition, in UCI transmission including HARQ-ACK, and/or channel state information (CSI), and/or scheduling request (SR), and/or beam related information, priorities may be configured differently according to the UCI type (i.e., whether the UCI is HARQ-ACK, CSI, SR, or beam-related information). For example, the HARQ-ACK may have a higher priority than the CSI, and the SR may have a higher priority than the HARQ-ACK. As another example, the HARQ-ACK and the SR may have the same priority higher than the priority of the CSI.

Hereinafter, a method for bit mapping of UCI types when the UCI types have different priorities and are transmitted on one PUCCH will be described in detail.

When a UCI type having a higher priority between UCIs configured on one PUCCH is defined as Type A (e.g., HARQ-ACK or type 1 CSI), and a UCI type having a lower priority is defined as Type B (e.g., CSI, or type 2 CSI including codebook information of higher resolution than type 1 CSI in the NR system), the UE may perform separate coding on each UCI type, map Type A to the front 2 bits of 16 QAM, and may map Type B to the rear 2 bits.

On the other hand, in the case where UCIs are configured with the same priority, the UE may transmit the UCIs configured with the same priority on a PUCCH, using the methods proposed in sections 3.1 and 3.2, i.e., "Triggering UCI transmission through high order modulation" and "Combination of bundling and 16 QAM," in place of the bit mapping method described above.

Here, UCI types belonging to Type A and Type B among various types of UCIs that are actually transmitted on a PUCCH may be predetermined or configured by L1 signaling or higher layer signaling.

When the payload sizes of Type A and Type B are different from each other, the UE may compress the UCI of a type (i.e., Type A or Type B) to the larger payload size (in a manner of bundling in the case of HARQ-ACK, rate-matching, puncturing) to match the payload sizes and then perform mapping. Alternatively, in the case where Type A is configured in W bits and Type B is configured in R bits (W>R), the UE may map some of the W bits to the rear 2 bits. In this case, some of the W bits mapped to the rear 2 bits may be Type A UCI information (e.g., HARQ-ACK information corresponding to the lowest cell index) having a lower priority. On the other hand, in the case where Type A is configured in W bits and Type B is configured in R bits (W<R), the UE may map some of the R bits to the front 2 bits. In this case, some of the R bits mapped to the front 2 bits may be Type B UCI information (e.g., rank information) having the higher priority.

After coding Type A and Type B separately, the UE may map Type B in the 16 QAM modulation scheme and map Type A in the QPSK modulation scheme. In this case, for Type A, the constellation points to which Type A is mapped may be interpreted as (or may correspond to) the four outermost constellation points of 16 QAM. As an example, in the example of FIG. 11, a rule may be configured such that Type A '00' is mapped to a constellation point corresponding to '0011' of 16 QAM, Type A '01' is mapped to a constellation point corresponding to '0111' of 16 QAM, Type A '10' is mapped to a constellation point corresponding to '1011' of 16 QAM, and Type A '11' is mapped to a constellation point corresponding to '1111' of 16 QAM.

In addition, as described above, the reliability performance between the front 2 bits and the rear 2 bits may be adjusted by setting the value of alpha. Thus, the value of alpha may be adjusted according to the payload sizes or code rates of Type A and Type B.

In an example, when the payload size of Type A is larger than the payload size of Type B (or when the payload size of Type B is smaller than the other one), the alpha may be set to a smaller value. Thereby, reliability performance of Type A may be improved.

In another example, when Type B is CSI and variation of the CSI compared to the previous CSI report is small, the alpha may be set to a smaller value. Thereby, reliability performance of Type A information may be improved.

In the above configuration, the alpha value may be set by L1 signaling or higher layer signaling. In this case, when the alpha is set to 0, this may mean that the UE transmits only Type A UCI.

In the above-described configuration, an applicable modulation method has been proposed mainly based on the modulation scheme of 16 QAM. However, the configuration may be extended to other modulation methods. For example, in the case of 64 QAM, the UE may map a UCI type having the higher priority to the MSB K bits (e.g., K=3) among the 6 bits constituting one symbol, and map a UCI type having the lower priority to the LSB 6-K bits.

Figure 12:
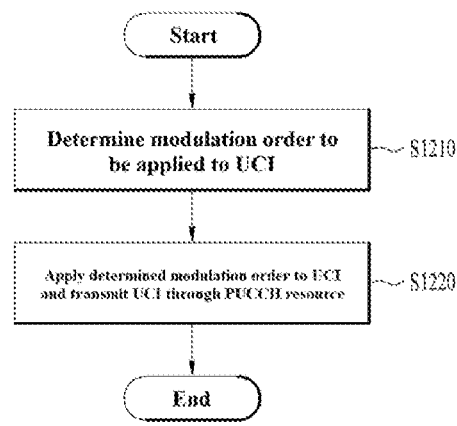
FIG. 12 is a flowchart illustrating a method for transmitting a physical uplink control channel (PUCCH) by a terminal applicable to the present disclosure.

FIG. 12 is a flowchart illustrating a method for transmitting a physical uplink control channel (PUCCH) by a terminal applicable to the present disclosure.

The UE determines a modulation order to be applied to the UCI, based on the payload size of uplink control information (UCI) to be transmitted (S1210).

In this case, the modulation order applied to the UCI may be determined as a first modulation order when the UCI payload size is less than or equal to the aforementioned bit value, or a second modulation order when the UCI payload size is greater than the aforementioned bit value. In this case, the second modulation order may represent a modulation scheme of a higher order than the first modulation order.

As an example, the first modulation order may be quadrature phase shift keying (QPSK), and the second modulation order may be 16 quadrature amplitude modulation (QAM). As another example, the first modulation order may be 16 QAM or QPSK and the second modulation order may be 64 QAM.

The UE transmits the UCI to which the determined modulation order is applied through a PUCCH resource (S1220).

In the present disclosure, when the UCI is acknowledgment information, the modulation order applied to the acknowledgment information and whether to perform bundling of the acknowledgment information may be determined according to a bit value range into which the payload size of the acknowledgment information falls. In other words, based on the payload size of the acknowledgment information, not only the modulation order applied to the acknowledgment information but also whether to bundle the acknowledgment information may be determined.

As an example, when the payload size of the acknowledgment information is less than or equal to a first bit value, the UE may apply the first modulation order to the acknowledgment information without bundling of the acknowledgment information and transmit the acknowledgment information through the PUCCH resource.

As another example, when the payload size of the acknowledgment information is greater than the first bit value and is less than or equal to a second bit value, the UE may apply the second modulation order in place of the first modulation order to the acknowledgment information without bundling of the acknowledgment information, and transmit the acknowledgment information through the PUCCH resource.

As another example, when the payload size of the acknowledgment information is greater than the second bit value and is less than or equal to a third bit value, the UE may apply the bundling and the first modulation order to the acknowledgment information and transmit the acknowledgment information through the PUCCH resource.

As another example, when the acknowledgment information payload size is greater than the third bit value, the UE may apply the bundling and the second modulation order to the acknowledgment information and transmit the acknowledgment information through the PUCCH resource.

In the present disclosure, the PUCCH resource may be configured as a PUCCH resource composed of one or two symbols or a PUCCH resource composed of four or more symbols.

Since each embodiment of the above-described proposed method can be considered as one method for implementing the present disclosure, it is apparent that each embodiment can be regarded as a proposed method. In addition, the present disclosure can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

Figure 13:
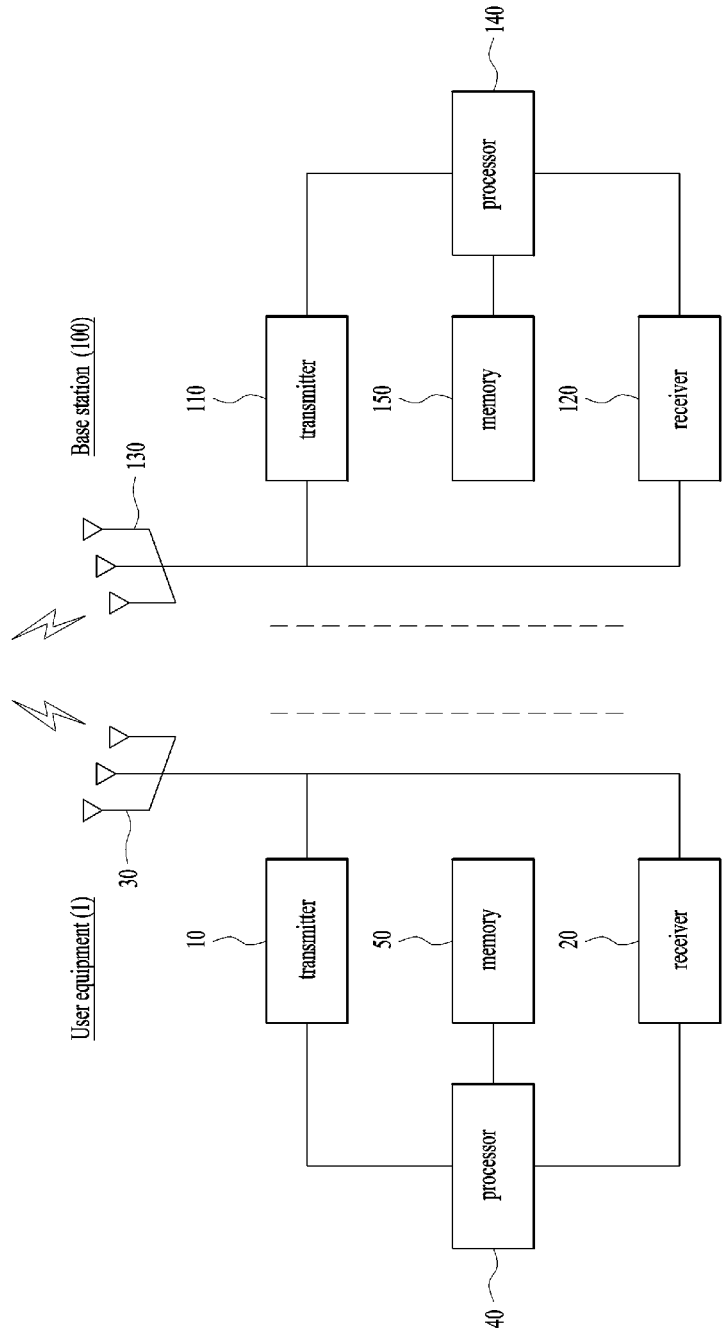
FIG. 13 is a diagram illustrating a configuration of a UE and a BS, through which the embodiments proposed in the present disclosure can be implemented.

FIG. 13 is a diagram illustrating configurations of a UE and a base station (BS) capable of being implemented by the embodiments proposed in the present disclosure. The UE and the BS shown in FIG. 13 are operated to implement the aforementioned embodiments of the method for transmitting or receiving ACK information between the UE and the BS.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE and the BS configured as above may be operated as follows.

The UE 1 determines, through the processor 40, a modulation order to be applied to the UCI based on the payload size of uplink control information (UCI) to be transmitted. Subsequently, the terminal 1 transmits the UCI to which the determined modulation order is applied to the base station 100 through the PUCCH resource via the transmitter 10.

The transmitter and the receiver included in the UE and the base station may perform a packet modulation/demodulation function, a high speed packet channel coding function, orthogonal frequency division multiple access (OFDMA) packet scheduling, and time division duplex (TDD) packet scheduling, and/or a channel multiplexing function for data transmission. In addition, the UE and the base station of FIG. 13 may further include a low power radio frequency (RF)/intermediate frequency (IF) unit.

The UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a handheld PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method for transmitting, by a terminal, a physical uplink control channel (PUCCH) to a base station in a wireless communication system, the method comprising:
   determining a modulation order to be applied to uplink control information (UCI) based on a payload size of the UCI to be transmitted; and
   transmitting the UCI comprising only acknowledgment information in accordance with the determined modulation order through a PUCCH resource,
   wherein, based on the payload size of the acknowledgment information being less than or equal to a first number of bits, the terminal applies a first modulation order to the acknowledgment information without bundling of the acknowledgment information,
   wherein, based on the payload size of the acknowledgment information being greater than the first number of bits and less than or equal to a second number of bits, the terminal applies a second modulation order, rather than the first modulation order, to the acknowledgment information without the bundling of the acknowledgment information,
   wherein, based on the payload size of the acknowledgment information being greater than the second number of bits and less than or equal to a third number of bits, the terminal applies the bundling and the first modulation order to the acknowledgment information, and
   wherein, based on the payload size of the acknowledgment information being greater than the third number of bits, the terminal applies the bundling and the second modulation order to the acknowledgment information.

2. The method of claim 1, wherein the PUCCH resource is composed of one or two symbols.

3. The method of claim 1, wherein the PUCCH resource is composed of four or more symbols.

4. The method of claim 1, wherein the acknowledgment information is HARQ-ACK information.

5. A terminal configured for transmitting acknowledgment information to a base station in a wireless communication system, the terminal comprising:
   a transmitter; and
   a processor operatively connected to the transmitter,
   wherein the processor is configured to:
   determine a modulation order to be applied to uplink control information (UCI) based on a payload size of the UCI to be transmitted; and
   transmit the UCI comprising only acknowledgment information in accordance with the determined modulation order through a PUCCH resource,
   wherein, based on the payload size of the acknowledgment information being less than or equal to a first number of bits, the terminal applies a first modulation order to the acknowledgment information without bundling of the acknowledgment information, wherein, based on the payload size of the acknowledgment information being greater than the first number of bits and less than or equal to a second number of bits, the terminal applies a second modulation order, rather than the first modulation order, to the acknowledgment information without the bundling of the acknowledgment information, wherein, based on the payload size of the acknowledgment information being greater than the second number of bits and less than or equal to a third number of bits, the terminal applies the bundling and the first modulation order to the acknowledgment information, and wherein, based on the payload size of the acknowledgment information being greater than the third number of bits, the terminal applies the bundling and the second modulation order to the acknowledgment information.

6. The terminal of claim 5, wherein the terminal is configured to communicate with at least one of another terminal, a terminal related to an autonomous driving vehicle, a base station or a network.

* * * * *